C. HYLAND.
FLEXIBLE STAY BOLT CONNECTION FOR BOILERS.
APPLICATION FILED JAN. 7, 1916.
1,229,961.
Patented June 12, 1917.
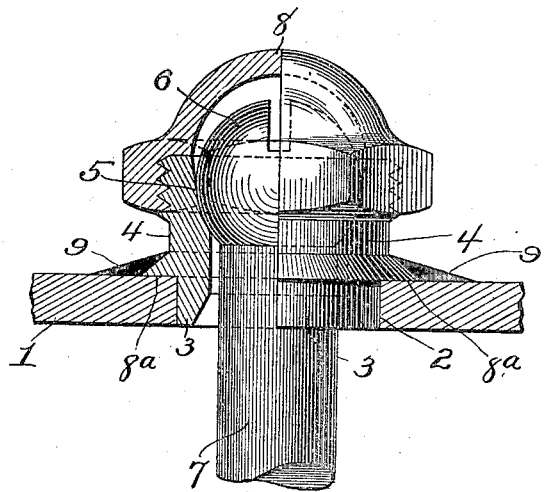
WITNESSES
INVENTOR

UNITED STATES PATENT OFFICE.

CHARLES HYLAND, OF PITTSBURGH, PENNSYLVANIA, ASSIGNOR TO FLANNERY BOLT COMPANY, OF PITTSBURGH, PENNSYLVANIA.

FLEXIBLE STAY-BOLT CONNECTION FOR BOILERS.

1,229,961.     Specification of Letters Patent.     Patented June 12, 1917.

Application filed January 7, 1916. Serial No. 70,841.

*To all whom it may concern:*

Be it known that I, CHARLES HYLAND, a citizen of the United States, and a resident of Pittsburgh, in the county of Allegheny and State of Pennsylvania, have invented certain new and useful Improvements in Flexible Stay-Bolt Connections for Boilers; and I do hereby declare the following to be a full, clear, and exact description of the invention, such as will enable others skilled in the art to which it appertains to make and use the same.

My invention relates to an improvement in flexible stay bolt connection for boilers, and is an improvement on the construction disclosed in application Serial Number 58,868 filed by B. E. D. Stafford, October 30th, 1915.

In the application above referred to, the roof plate or outer sheet of the boiler is provided with an opening for the passage of the bolt, and with a counterbore around said opening, and a sleeve seated within the counterbore and secured to the plate or sheet by welding.

The object of my invention is to dispense with the counterbore and provide the sleeve with a shoulder to rest on the plate, and a lip or flange to rest within the opening in the plate and take the lateral stresses to which the sleeve may be subjected, the sleeve being secured to the plate by welding.

The accompanying drawing is a view partly in section and partly in elevation of my invention as applied to a boiler sheet.

1 represents the roof plate or sheet of a locomotive boiler provided with an opening 2 for each stay bolt, the said opening being of a size sufficient to receive the flange 3 of the sleeve 4. The sleeve is provided interiorly with a curved seat 5 for the spherical head 6 of the stay bolt 7, and is provided exteriorly at its outer end with threads for the attachment of the cap 8, the inner face of the latter being curved to conform to the curvature of the head of the bolt, sufficient clearance being left for a limited movement of the head 6 in the sleeve and cap or an equal movement of the sleeve and cap on the head. The outer edge or periphery of the cap is made hexagonal or angular for the attachment of the wrench employed for screwing and unscrewing the cap.

The sleeve 4 is also provided with an annular shoulder $8^a$ which rests on the outer face of the plate or sheet 1 and sustains the sleeve against longitudinal pulling stresses, while the flange 3, as before explained takes all the lateral stresses.

The flange 3 fits snugly within the opening 2 in the plate so that there cannot be any appreciable lateral movement of the sleeve, and the inner face of the flange is preferably beveled outwardly and downwardly as shown so as to permit of the necesary movement of the bolt. The portion of the sleeve immediately above the shoulder $8^a$ is made to flow or project outwardly as shown, so that after it has been welded to the sheet, the metal of the sleeve will underlie the metal of the weld and thus lock the sleeve solidly in place.

In assembling the parts, the outer face of the sheet is cleaned off so as to make a smooth flat seat for the sleeve, and after the latter has been properly placed, the welding composition or filler is applied as at 9, and the weld effected by the oxy-acetylene welding method or by electrically welding the parts. The welding fuses the metals so that the union between the parts will be of a homogeneous character thereby securing all of the advantages of a sleeve integral with the plate, and by extending the sleeve through the sheet, I not only provide for taking care of the lateral stresses, but also hold the sleeve positively in position and proper alinement during the process of welding the parts.

Having fully described my invention what I claim as new and desire to secure by Letters-Patent, is:—

1. In stay bolt connection for boilers, the combination of a boiler plate having an opening through the same, and a stay bolt sleeve having an integral shoulder to rest on the outer face of the plate and an integral flange conforming in size and shape to the opening in the plate and resting within the latter, the shoulder being secured to the plate by welding.

2. In stay bolt connection for boilers, the combination of a boiler plate having a bolt opening, a stay bolt sleeve having a shoulder and a flange, the latter conforming in size and shape to the opening in the plate and resting within said opening and the flange resting on the outer face of the plate, the said shoulder having a beveled upper face, and secured to the plate by welding.

In testimony whereof, I have signed this specification in the presence of two subscribing witnesses.

CHARLES HYLAND.

Witnesses:
 EDWIN S. RYCE,
 F. H. ALLISON.

Copies of this patent may be obtained for five cents each, by addressing the "Commissioner of Patents, Washington, D. C."